US012645804B2

(12) United States Patent
Wang et al.

(10) Patent No.: US 12,645,804 B2
(45) Date of Patent: Jun. 2, 2026

(54) MANAGING IMPLEMENTATION OF APPLICATION-CODE SCANNING PROCESSES

(71) Applicant: Oracle International Corporation, Redwood Shores, CA (US)

(72) Inventors: Jiun-Cheng Wang, San Jose, CA (US); Harish Santhanagopal, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 18/627,259

(22) Filed: Apr. 4, 2024

(65) Prior Publication Data

US 2025/0094598 A1      Mar. 20, 2025

Related U.S. Application Data

(60) Provisional application No. 63/583,399, filed on Sep. 18, 2023.

(51) Int. Cl.
G06F 21/57          (2013.01)
(52) U.S. Cl.
CPC ...... G06F 21/577 (2013.01); G06F 2221/033 (2013.01)
(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 7,200,720 | B1 * | 4/2007 | Yang ................... | G06F 16/2308 |
| | | | | 711/147 |
| 9,600,666 | B1 * | 3/2017 | Harter ................. | H04L 63/1433 |
| 10,621,360 | B2 | 4/2020 | Holz et al. | |
| 10,706,156 | B2 * | 7/2020 | Bhalla ................... | G06F 21/577 |
| 11,386,209 | B2 * | 7/2022 | Roberts ..................... | G06F 8/75 |
| 2005/0125427 | A1 * | 6/2005 | Dageville ............. | G06F 16/217 |
| 2014/0075035 | A1 * | 3/2014 | Revanuru ............. | G06F 9/5072 |
| | | | | 709/226 |
| 2019/0205542 | A1 | 7/2019 | Kao et al. | |
| 2019/0327258 | A1 * | 10/2019 | Choi ........................ | H04L 43/50 |
| 2020/0287928 | A1 * | 9/2020 | Murray ................. | G06F 21/577 |

(Continued)

FOREIGN PATENT DOCUMENTS

CN          112560048  A       3/2021

OTHER PUBLICATIONS

"Develop software fearlessly", Nov. 14, 2023, pp. 1-2.

(Continued)

*Primary Examiner* — Meng Li
(74) *Attorney, Agent, or Firm* — Invoke

(57) ABSTRACT

Techniques for managing the implementation of application-code scanning processes are disclosed. A system scans application code by analyzing metadata associated with the application code to identify a set of data needed to scan the application code with a scanning application. Based on the information obtained from the application metadata, the system identifies extraction processes that are needed to obtain the set of data. The system applies a set of one or more application-code scanners by implementing the extraction processes. The system presents in a graphical user interface (GUI) a set of results from scanning operations.

20 Claims, 4 Drawing Sheets

100

(56) References Cited

U.S. PATENT DOCUMENTS

| | | | |
|---|---|---|---|
| 2021/0357592 A1* | 11/2021 | Balasubrahmanian | ...................... G06F 40/279 |
| 2022/0050840 A1* | 2/2022 | Parravicini | ............ G06N 5/025 |
| 2022/0232040 A1* | 7/2022 | Crabtree | ................. H04L 63/20 |
| 2023/0067222 A1 | 3/2023 | Filji et al. | |
| 2025/0045413 A1* | 2/2025 | Sahin | .................... G06F 21/563 |

OTHER PUBLICATIONS

"Open Source Vulnerability Management", Retrieved from https://fossa.com/product/open-source-vulnerability-management, Nov. 14, 2023, pp. 6.
"Optimize Your Software Supply Chain With Reliable Automation", Retrieved from https://www.sonatype.com/products/software-supply-chain-management, Retrieved on May 28, 2024, pp. 1-17.
"Optimize Your Software Supply Chain", Retrieved from https://www.sonatype.com/, Retrieved on May 28, 2024, pp. 1-9.
"Secure Your Code by Mitigating Open Source Risk", Nov. 14, 2023, pp. 7.
"Secure Your Products From Repo to Release", Retrieved from https://fossa.com/, Retrieve don May 28, 2024, pp. 1-8.
"Tanzu Application Platform v1.3", Retrieved from https://docs.vmware.com/en/VMware-Tanzu-Application-Platform/1.3/tap.pdf, Nov. 1, 2023, pp. 1-1353.
"Vulnerability scanning, storing, and viewing for your supply chain", Oct. 26, 2023, p. 1.
"Why choose Sonatype?", Nov. 14, 2023 pp. 2.

* cited by examiner

100

MANAGING IMPLEMENTATION OF APPLICATION-CODE SCANNING PROCESSES

INCORPORATION BY REFERENCE; DISCLAIMER

Each of the following applications are hereby incorporated by reference: Application No. 63/583,399 filed on Sep. 18, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to managing scanning operations for application code. In particular, the present disclosure relates to determining, based on application metadata, extraction processes to extract data from application code to provide to scanning applications.

BACKGROUND

Enterprises implement many different software applications to perform different functions across different work groups. Frequently, enterprises implement applications designed by an external entity for use within the enterprise. These may include accounting, sales, inventory management, security, and communications applications, for example. Applications can expose enterprises to security risks, particularly when the applications are designed by external entities. Accordingly, enterprises perform scans of code and software applications to ensure the applications do not expose the enterprise to security risks. In addition to security scans, enterprises scan code and software to ensure compliance with enterprise standards, with compatibility requirements, and with operational specifications. When an enterprise includes multiple different teams or divisions implementing different software applications, ensuring compliance with enterprise requirements, and ensuring organizations are running software scanned by the most recent versions of scanners is challenging.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
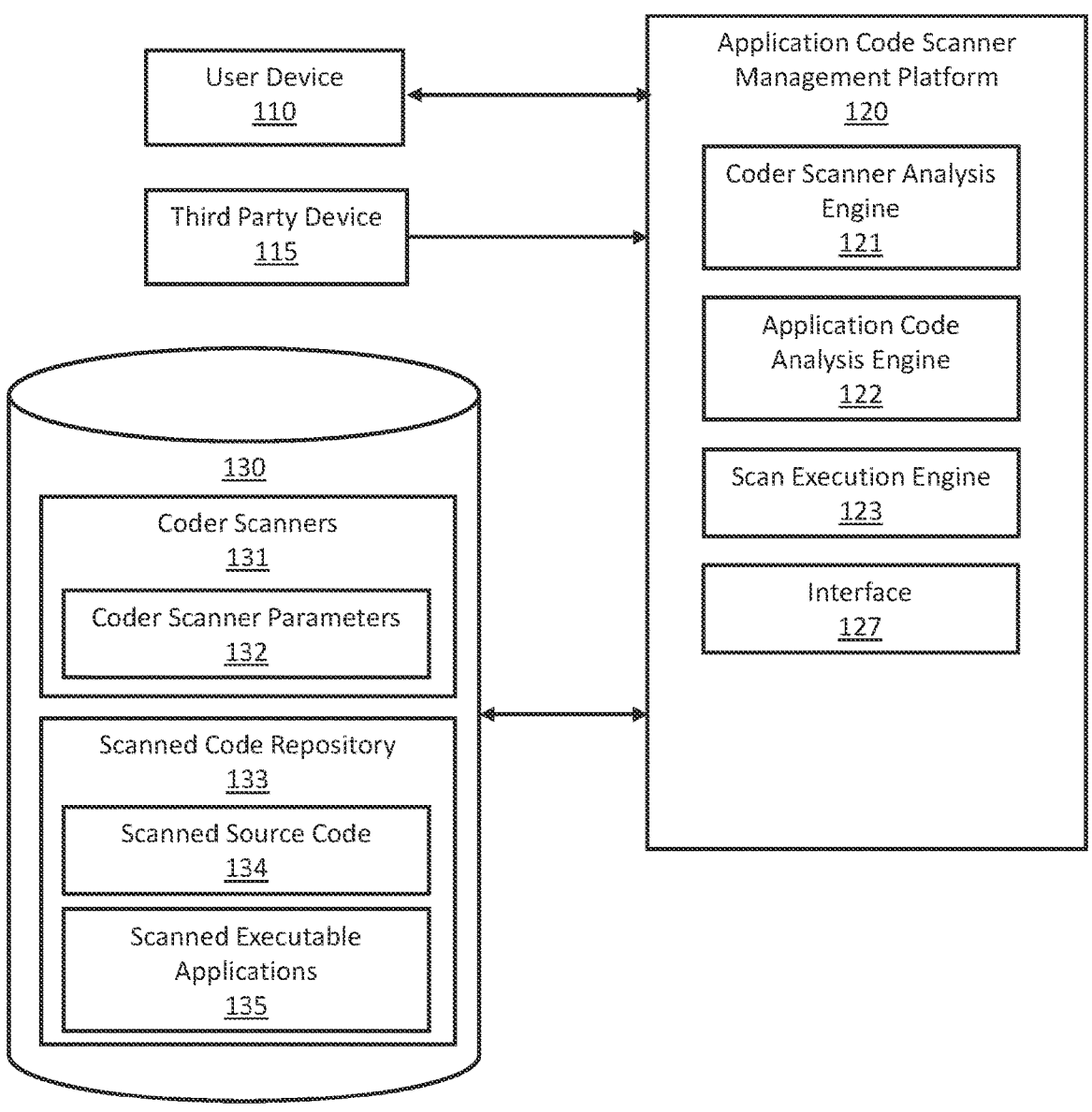
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. APPLICATION CODE SCANNER IMPLEMENTATION SYSTEM
3. DETERMINING APPLICATION DATA EXTRACTION PROCESSES FOR APPLYING SCANNERS TO APPLICATION CODE
4. EXAMPLE EMBODIMENT
5. COMPUTER NETWORKS AND CLOUD NETWORKS
6. HARDWARE OVERVIEW
7. MISCELLANEOUS; EXTENSIONS

1. General Overview

One or more embodiments manage scanning operations for scanning application code, including source code and executable software, by analyzing metadata associated with the application code. The system identifies parameters associated with the code scanner, including input and/or output parameters. The system identifies a data type and/or data format of the code scanner parameters. Furthermore, the system determines, based on the application metadata, whether the code scanner parameters are optional or required to perform an application code scan.

In an example, one code scanner may require a first set of data in a first format as input data. Another code scanner may require a second set of data in a second format as input data. For each code scanner, the system identifies (a) requirements of the code scanner, and (b) based on the application code metadata, an extraction process for obtaining the first and second sets of data from the application code.

If the application code includes the needed data in a format that is incompatible with the code scanner, the system transforms the data into a format compatible with the code scanner. In one example, one code scanner scans precompiled code and generates a report in a JavaScript Object Notation (JSON) format. Another code scanner scans executing software and generates a report in a hypertext markup language (HTML) file. The system identifies in the application code metadata the portions of the application code that are needed to run a first code scanner. The system identifies in the application code metadata the processes that need to be performed by the executing software to obtain the data necessary to run a second code scanner.

The system presents in a graphical user interface (GUI) a set of results from multiple code scanners. For example, the system may convert the data from the JSON file and the HTML file into a same format for presenting to a user in the GUI.

One or more embodiments maintain a repository of scanned application code, including source code and executable software. When users want to use a particular application—either locally on a user device or via a cloud-based service, such as a virtual machine—the system provides the user with the previously-scanned application code stored in the repository. The system may detect when an entity provides an update or modification to a code scanner. Based on receiving scan updates, the system re-scans any application code that was previously scanned by the same code scanner. If the system detects any new errors based on the updated code scanner, the system may perform remedial action, such as preventing users from accessing the application code or generating notifications to one or more users associated with the application code. For example, if the system determines that updates to a scanning application cause an application to fail to meet the set of operational specifications, the system may (a) refrain from storing the updated code scanner, (b) prevent users from executing the application code, or (c) generate notifications to users associated with the application code that the application code no longer meets operational specifications.

One or more embodiments described in this Specification and/or recited in the claims may not be included in this General Overview section.

2. Application Code Scanner Implementation System

FIG. 1 illustrates a system 100 in accordance with one or more embodiments. As illustrated in FIG. 1, system 100 includes an application code scanner management platform 120, one or more user devices 110, one or more third-party devices 115, and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

An application code scanner management platform 120 manages scanning operations associated with a set of applications. For example, the application code scanner management platform 120 may scan each application utilized within an enterprise to ensure the applications meet a common set of security requirements and compatibility requirements with other applications implemented by the enterprise. Upon scanning the applications, the application code scanner management platform 120 may store the scanned applications in a repository. Users with the required authorization in the enterprise may access, download, and execute the stored applications. The application code scanner management platform 120 may also analyze application scanners to determine whether the scanners meet predefined criteria for applying the scanners to applications utilized, supported, or maintained by the enterprise. For example, an enterprise may require particular security protocols to be met by applications running on enterprise compute resources. Prior to storing a scanner to be applied to enterprise applications, the application code scanner management platform 120 may verify that the scanner checks for the required security protocols. Examples of operations for managing the implementation of scanning applications to application code are described below with reference to FIG. 2.

In an embodiment, the application code scanner management platform 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

The application code scanner management platform 120 includes a code scanner analysis engine 121. The code scanner analysis engine 121 analyzes code scanners 131 to identify coder scanner parameters 132 associated with executing the coder scanners. For example, the code scanner analysis engine 121 may identify a type of data, or a data file type, that a code scanner requires as input data. Additionally, or alternatively, the code scanner analysis engine 121 may identify a source location from which a code scanner obtains input data. Examples of code scanner parameters include the following: input data file types, input data values, input data storage locations, output data file types, output data values, output data storage locations, functions performed by a code scanner, memory required to store the code scanner, compute resources, such as processors and processing time, required to execute a scan with the code scanner, and an operating system on which a code scanner may run. According to one example, one code scanner may require a data file representing source code. Another code scanner may require values and data packets input to, and output from, an executing application. A code scanner may require information about where data generated by an application is stored and a source from where an application obtains data. A code scanner may require data about an application's API, data transmission information (such as a path where data is transmitted, or from where data is obtained), and encryption data.

In one embodiment, the application code scanner management platform 120 stores a set of code scanners 131 that may be applied to applications. For example, if a user or entity would like to run a new application in an enterprise's cloud environment, the user may provide to the application code scanner management platform 120 one or more data files associated with the application. The user or entity may further specify one or more code scanners 131 to apply to the application. In addition, or in the alternative, the application code scanner management platform 120 may identify one or more code scanners 131 that are required to be applied to the application. For example, an enterprise may specify that every application running by any organization within the enterprise must pass a predefined set of security scans and compatibility scans.

The code scanners 131 include, for example, SQL injection scanners, cross-site scripting (XSS) scanners, buffer overflow scanners, authentication scanners, sensitive data exposure scanners, insecure API usage scanners, code quality scanners, insecure dependency scanners, race conditions scanners, input validation error scanners, error handling and logging scanners, file handline vulnerability scanners, business logic flaw scanners, and hardcoded secrets scanners.

In one embodiment, the code scanners 131 include an SQL injection scanner. The SQL injection scanner may be a software application designed to identify and detect vulnerabilities in web applications and database systems that are susceptible to SQL injection attacks. SQL injection is a common type of cyberattack where malicious actors exploit poorly sanitized user inputs to inject malicious SQL code into a web application's database query. This can lead to unauthorized access, data theft, data manipulation, or even the complete compromise of a system. SQL injection scanners work by analyzing a web application's input fields, uniform resource locator (URL) parameters, and other user inputs to check if they are vulnerable to SQL injection. The SQL injection scanner may, for example, send various types of malicious SQL payloads to the application being scanned and then analyze the responses for signs of vulnerability.

In one embodiment, the code scanners 131 include an XSS scanner. The code scanner may be a software application designed to identify and detect vulnerabilities in web applications that are susceptible to XSS attacks. XSS is a common type of cyberattack where malicious actors inject malicious scripts into web pages viewed by other users. These scripts can be executed in the context of a victim's browser, potentially leading to the theft of sensitive data, session hijacking, or other malicious actions. The XSS scanner may examine a web application's code and input points to check if they are vulnerable to XSS attacks. The XSS scanner may, for example, inject different types of payloads (such as JavaScript) into the application's input fields, URL parameters, or other user inputs and then analyze the responses for signs of vulnerability.

In one embodiment, the code scanners 131 include a buffer overflow scanner. Buffer overflow is a common type of software vulnerability where a program does not properly validate and manage input data, allowing an attacker to overwrite and manipulate memory beyond the intended boundaries of a buffer or data structure. This can lead to the execution of arbitrary code, system crashes, or unauthorized access to the affected system. The buffer overflow scanner may analyze application code or binaries to detect instances where buffer handling and memory management may be insecure. In one or more embodiments, the buffer overflow scanner may analyze one or both of source code and binary (or a compiled and executable set of application code).

In one embodiment, the code scanners 131 include an authentication scanner. The authentication scanner is configured to identify weaknesses in authentication processes for software. For example, the authentication scanner may perform password cracking tests. This involves attempting to guess or crack passwords to gain unauthorized access. The authentication scanner may employ dictionary attacks, brute-force attacks, or other techniques to test password strength. In one or more embodiments, the authentication scanner may perform multi-factor authentication testing. The scanner may assess a the effectiveness of multi-factor authentication mechanisms for an application. The scanner may, for example, attempt to bypass or compromise the additional security factors beyond just passwords. In one or more embodiments, the authentication scanner attempts to identify valid user accounts or system users, that can be valuable information for attackers. The scanner may attempt to access the application using common usernames, or by inspecting error messages, for example. In one or more embodiments, the authentication scanner checks whether authentication mechanisms for an application adhere to security best practices and organizational policies. For example, the authentication scanner may check for the proper use of encryption, secure password policies, account lockout settings, and session management.

In one embodiment, the code scanners 131 include a sensitive data exposure scanner. The sensitive data exposure scanner detects vulnerabilities in applications or websites that could potentially lead to the exposure of sensitive or confidential information. For example, the sensitive data exposure scanner may check application code to identify how sensitive or confidential data is managed, such as personal information (e.g., employee or customer names, addresses, and Social Security numbers), financial data, intellectual property, and healthcare records. The scanner may analyze, for example, source code, configuration files, database schemas, network traffic, or storage systems associated with the application. In one or more embodiments, the scanner assesses whether sensitive data is appropriately encrypted both at rest (in storage) and in transit (during communication). The scanner may check for the use of secure encryption protocols and configurations. In one or more embodiments, the scanner performs data leakage preventions (DLP) checks to identify and prevent data leakage or unauthorized data transfers.

In one embodiment, the code scanners 131 include an insecure API usage scanner. The insecure API usage scanner identifies vulnerabilities and security weaknesses related to the use of application programming interfaces (APIs) in software applications. APIs are sets of rules and protocols that allow different software applications to communicate and interact with each other. Insecure API usage can lead to various security issues, including data breaches, unauthorized access, and application vulnerabilities. In one or more embodiments, the insecure API usage scanner assesses how APIs are implemented and used within an application or system. The scanner examines API endpoints, authentication mechanisms, data transmission methods, and other aspects of API usage. The scanner may check if proper security controls are in place for APIs. This includes authentication and authorization mechanisms, input validation, and encryption for data transmitted via APIs. The scanner may evaluate how APIs authenticate and authorize users or systems to access specific functions or resources. The scanner may assess whether sensitive data transmitted through APIs is adequately protected. For example, the scanner may check for encryption and secure transmission protocols to prevent data exposure in transit. Insecure API usage can be exploited through various attacks, including injection attacks. In one or more embodiments, the insecure API usage scanner checks whether APIs validate and sanitize input data to prevent common security risks like SQL injection, Cross-Site Scripting (XSS), and other injection attacks. In one or more embodiments, the scanner checks for the implementation of rate limiting and throttling mechanisms in APIs to prevent abuse, such as Distributed Denial of Service (DDoS) attacks.

In one embodiment, the code scanners 131 include a source code quality scanner, a static code analysis tool, or a static code analyzer. The source code quality scanner analyzes the source code without executing it to identify various types of issues, including coding errors, potential vulnerabilities, coding style violations, and maintainability problems. For example, the code quality scanner may assess the complexity of code by examining factors such as function length, nesting depth, and cyclomatic complexity. In one or more embodiments, the source code quality scanner identifies potential security vulnerabilities in the code, such as SQL injection, cross-site scripting (XSS), and buffer overflows. The scanner may rely on a database of known vulnerability patterns to perform this analysis. In one or more embodiments, the source code quality scanner detects code smells, or indications of poor code design or practices. Examples of code smells include duplicated code, long methods, and inappropriate use of global variables. In one or more embodiments, the source code quality scanner identifies documentation associated with code, such as comments and in-line code documentation.

Other examples of code scanners 131 include: cryptographic weakness scanners, that identify places where encryption and hashing algorithms are used incorrectly; insecure dependency scanners, that locate outdated or vulnerable third-party libraries and components that the application relies on; race condition scanners, that detect places in the code where race conditions might occur, potentially leading to unexpected behavior or security vulnerabilities; input validation error scanners, that identify instances where input from users or external sources is not properly validated, leading to unexpected behaviors or potential security issues; error handling and logging scanners, that locate parts of the code where error handling and logging are not implemented properly, potentially leaking sensitive information to attackers; file handling vulnerability scanners, that identify instances where file operations are not properly controlled, potentially leading to unauthorized access or manipulation of files; business logic flaw scanners, that identify logical issues in the code that might not be directly related to common security vulnerabilities but could still pose a risk to the application's intended behavior, and hardcoded secrets scanners, that locate hardcoded credentials, API keys, or other sensitive information that should not be exposed in the source code. While examples of scanners are described as separate scanners, embodiments encompass any combination of scanning operations within a same scanner or among different scanners.

In one embodiment, the application code scanner management platform 120 presents a user with a set of user interface (UI) elements in a GUI representing a set of available code scanners 131. For example, the application code scanner management platform 120 may present the GUI via the interface 127. A user may select from among the UI elements to select scans to be performed on application code. As another example, the application code scanner management platform 120 may identify an update to an existing coder scanner 131. The application code scanner management platform 120 may be configured to automatically, without intervening user input, run an updated scan of any source code files 134 or executable applications 135 that were previously scanned by the same code scanner 131. For example, the system may store source code 134 and scanned executable applications 135 in a scanned code repository 133 in the data repository 130. Based on successfully passing scans, the system may store metadata, such as log files and/or tables, indicating which scans were applied to the source code files 134 and scanned executable applications 135 at what times, and what were the results. Based on identifying an update to a code scanner 131, the application code scanner management platform 120 may refer to the log files and/or tables to identify the application code to which the code scanner 131 was previously applied. The scan execution engine 123 may then re-scan the identified application code.

In one or more embodiments, interface 127 refers to hardware and/or software configured to facilitate communications between the application code scanner management platform 120 and one or both of the user device 110 and the third-party device 115. Interface 127 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 127 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 127 is specified in one or more other languages, such as Java, C, or C++.

An application code analysis engine 122 obtains application metadata corresponding to scan application parameters identified by the code scanner analysis engine 121. For example, if a scan application is a type that scans source code to identify a particular set of attributes in the source code, the system obtains metadata associated with the source code to identify parameters, such as a type of format in which the source code is stored, inputs, outputs, variables, and code structures associated with the source code. As another example, if a scan application is a type that scans a binary, or compiled and executable file, the system obtains metadata associated with the types of inputs to, and outputs from, the executing software.

A scan execution engine 123 determines an extraction process for extracting the data required to perform the selected scans. For example, if a code scanner 131 is a type that scans source code to identify a particular set of attributes in the source code, the scan execution engine 123 determines an extraction process for extracting data from the source code. The scan execution engine 123 may determine that some parameters may be identified at particular locations in the source code. The scan execution engine 123 may determine that some data extracted from the source code should be transformed into another type of data for a scanning application. As another example, if a code scanner 131 is a type that scans a binary, or compiled and executable file, the scan execution engine 123 may determine how to execute operations of the executable application to obtain data required by the scanning application. For example, a code scanner 131 that checks a security of data transmissions may require providing the application with an API function call to initiate a data transmission. Analyzing the data transmission may include identifying a location of an encryption key or hashing table required to analyze the transmission.

The scan execution engine 123 executes the data extraction process identified for a particular application to run one or more scans on the application. In one embodiment, the application code scanner management platform 120 presents scan results via the interface 127. For example, the application code scanner management platform 120 may present in GUI a set of results from one or more scanning applications.

In one embodiment, the application code scanner management platform 120 stores scanned source code 134 and scanned executable applications 135 in a scanned code repository 133 in the data repository 130. When users want to use a particular application, or access a particular source code file, the application code scanner management platform 120 provides the user with the corresponding scanned application code (e.g., scanned source code 134 or scanned executable application 135). In addition, when the application code scanner management platform 120 detects an update to a code scanner 131, the system may re-scan the stored scanned source code 134 or scanned executable application 135 without needing to scan separate versions of the corresponding source code or applications maintained by individual user devices 110. In addition, if a third party that develops an application corresponding to a stored source code 134 or scanned executable application 135 updates the application, the system may apply the code scanners 131 to the updated code and/or application, without scanning each individual instance of the code and application that may be stored on individual user devices 110. If the application passes the scans, the application code scanner management platform 120 may replace a previous version of the scanned source code 134 or scanned executable application 135 with the updated version and push the updated version to the individual user devices 110.

Figure 2:
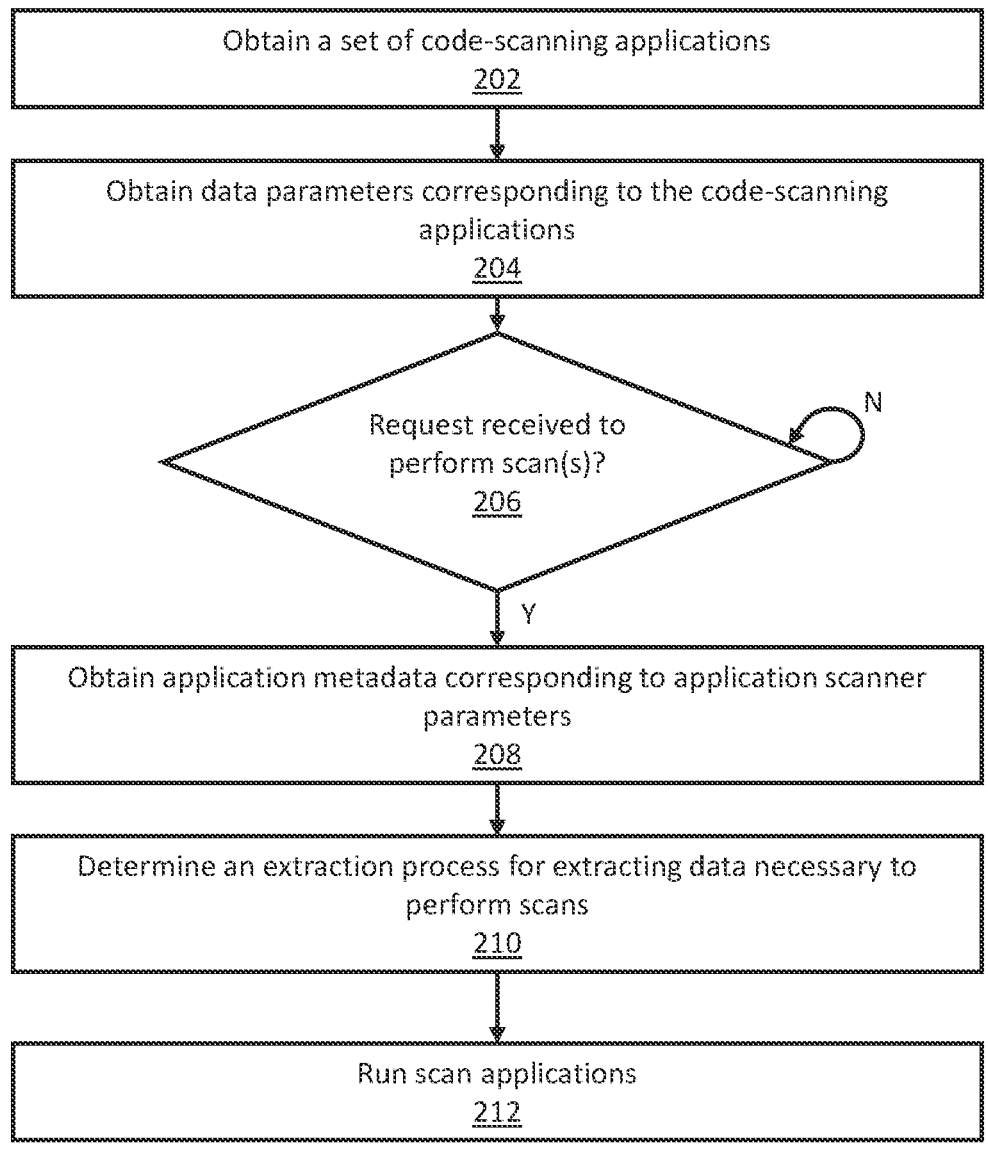
FIG. 2 illustrates an example set of operations for identifying and implementing data extraction processes to apply scanners to applications in accordance with one or more embodiments.

3. Determining Application Data Extraction Processes for Applying Scanners to Application Code FIG. 2 illustrates an example set of operations for analyzing application code metadata to processes for extracting application data necessary to scan application code in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains a set of code scanners (Operation 202). Examples of code scanners include SQL injection scanners, cross-site scripting (XSS) scanners, buffer overflow scanners, authentication scanners, sensitive data exposure scanners, insecure API usage scanners, code quality scanners, insecure dependency scanners, race conditions scanners, input validation error scanners, error handling and logging scanners, file handline vulnerability scanners, business logic flaw scanners, and hardcoded secrets scanners.

The system obtains code scanner parameters corresponding to operation of the code scanners (Operation 204). The parameters may specify how the code scanner obtains input data, generates output data, what types of data the code scanner requires to operate, and functions that are performed by the code scanner.

For example, the system may identify a type of data (e.g., source code, binary (or compiled and executable application), data file, HTML file, JSON file) needed for the code scanners to operate. As one example, one code scanner may require a data file representing source code. Another code scanner may require values and data packets input to, and output from, an executing application. A code scanner may require information about where data generated by an application is stored, or from where an application obtains data. A code scanner may require data about an application's API, data transmission information (such as a path where data is transmitted, or from where data is obtained), and encryption data.

In one example embodiment, a code scanner analyzes an application's source code to identify vulnerabilities in the source code. For example, the source code may include encryption data that should not be present in the source code and that should instead be passed to an executing application. As another example, the source code may identify sensitive data that is configured to be displayed on a web page. As another example, the source code may identify SQL queries in the source code that leave an application open to unauthorized access. In addition, or in the alternative, the code scanner may identify features that are not desired, but do not necessarily amount to vulnerabilities. For example, the code scanner application may identify unused variables in the source code or repetitive code.

In another example embodiment, a code scanner analyzes a binary, or compiled and executable code. The code scanner may analyze authentication operations performed by the application to identify vulnerabilities. The code scanner may identify places where encryption and hashing algorithms are used incorrectly. In addition, or in the alternative, the code scanner may identify inputs from users that are improperly validated.

In one or more embodiments, the system obtains code scanner parameters by accessing an application programming interface (API) of the code scanner. The API may specify functions performed by the code scanner, input data required to perform the functions, and output data generated based on performing the functions. For example, the system may access, via the API or documentation describing the API, data regarding the code scanner's functionality, available endpoints, request/response formats, and authentication mechanisms. The system may identify, via the API or corresponding documentation, any access control mechanisms, such as API keys, OAuth authentication, or other security protocols required to perform scans with the application scanner.

The system determines whether a request has been received to perform one or more code scans (Operation 206). For example, the system may present a set of user interface (UI) elements in a GUI representing a set of available code scans. A user may select from among the UI elements to select scans to be performed on application code. As another example, the system may identify an update to an existing code scanner. The system may be configured to automatically, without intervening user input, run an updated scan of any applications that were previously scanned by the same code scanner. For example, the system may store source code and binaries for applications in a data repository. Based on successfully passing scans, the system may store metadata, such as log files and/or tables, indicating which scans were applied to the source code files and binaries at what times. Based on identifying an update to a code scanner, the system may refer to the log files and/or tables to identify the application code to which the code scanner was previously applied. The system may then re-scan the identified application code.

According to another embodiment, the system may determine that an application associated with previously-scanned source code or binary has been updated or modified. For example, the system may receive from a developer an update to the previously-scanned application. The system may apply the update and re-scan the application code with the same set of one or more code scanners that were previously applied to the application code.

The system obtains application metadata that corresponds to the application scanner parameters (Operation 208). For example, if an application scanner is a type that scans source code to identify a particular set of attributes in the source code, the system obtains metadata associated with the source code to identify parameters, such as a type of format in which the source code is stored, inputs, outputs, variables, and code structures associated with the source code. As another example, if a scan application is a type that scans a binary, or compiled and executable file, the system obtains metadata associated with the types of inputs to, and outputs from, the executing software. As an example, the system may analyze an API associated with the application, or documentation describing the API, to identify types of data that are provided to the application and types of data that are generated by the application. The metadata may include, for example: information about how the application code structures SQL queries; information about how data is generated and presented by the application; information about how the application presents data in web pages; information about how and where the application stores data in memory, including buffering processes implemented by execution of the application; information about authentication processes of the application; information about how passwords and API keys are generated and stored; information about how and where encryption keys are generated and stored; and information about how errors are generated and logged.

Based on the obtained metadata, the system determines an extraction process for extracting the data required to perform the selected scans (Operation 210). The system determines the extraction process by comparing the code scanner parameters with the application parameters. The system determines processes to be performed to cause the application parameters to correspond to the code scanner parameters.

For example, if a scan application is a type that scans source code to identify a particular set of attributes in the source code, the determines an extraction process for extracting data from the source code. The system may determine that some parameters may be identified at particular locations in the source code. Accordingly, the system stores or initiates a set of operations for accessing the data in the particular locations. The system may determine that some data extracted from the source code should be transformed into another type of data for a scanning application. Accordingly, the system identifies processes and/or intermediate applications capable of performing the transformations. As another example, if a scan application is a type that scans a binary, or compiled and executable file, the system may determine how to execute operations of the executable application to obtain data required by the scanning application. In one example, executing operations of the executable application includes spinning up a virtual machine in a test environment, running the executable on the virtual machine, and generating inputs to execute the operations in the executable application.

According to one example, a scanning application that checks a security of data transmissions may require providing the application with an API function call to initiate a data transmission. Analyzing the data transmission may include identifying a location of an encryption key or hashing table required to analyze the transmission. Analyzing the data transmission may include identifying, by the metadata, the format of the data output by the application. An extraction process may include transforming the output data into a different format. As another example, a scanning application that looks for authorization vulnerabilities may identify a sequence of operations, including providing a username, providing a password, and providing another authentication token that are required by the application to perform authentication. According to yet another example, a scanning application that analyzes file security may identify a sequence of operations performed by the application to store data at a particular location. The extraction process may include analyzing each step in the sequence of operations to determine whether the step is vulnerable to unauthorized access.

In one or more embodiments, the system generates an extraction process plan for extracting the data from the application that is necessary to run a selected code scanner. For example, the system may generate a plan including: (a) spin up a virtual machine, (b) execute application code in the virtual machine, (c) provide a set of instructions to the application code to initiate a desired set of functions, (d) access results data generated by the application code at a particular memory location, and (e) convert the results data from one file format into another file format.

The system initiates the set of operations specified in the extraction process plan to run a selected code scanner (Operation 212). In one embodiment, the system presents to a user scan results. For example, the system may present in a graphical user interface (GUI) a set of results from one or more scanning applications. The system may convert an output format generated by the respective scanning applications into a single format that may be presented as visual data in the GUI. For example, if one scanning application generates a 10,000 token log file, the system may extract from the log file key results and present the results, such as "12 errors detected," "2 vulnerabilities detected," or "scan passed." As another example, a scanning application may generate as output data a JSON file. The system extracts from the JSON file key results and presents the results. In one embodiment, the system presents in the GUI a URL that navigates to the raw scan results (e.g., to a representation of a log file, a JSON file, an HTML file, etc.)

In one embodiment, upon scanning application code, the system maintains a repository of scanned application code. When users want to use a particular application, or access a particular source code file, the system provides the user with the previously-scanned application code from the repository. In the embodiment in which the system maintains the repository of scanned application code, the system may further track which entities have downloaded scanned application code to be run on a remote device. When the system receives an updated to one or more code scanners used to scan the application code, the system generates or obtains a copy of the scanned code stored in the repository. The system validates the updated code scanner to ensure the code scanner meets a set of specifications. For example, the system may ensure the code scanner is still compatible with applications maintained by an entity. The system may ensure that the code scanner scans for a set of issues that the entity specifies. The system applies the code scanner to the copy of the previously scanned application code. If the system identifies any warnings or issues that require resolution based on scanning the application code, the system resolves the issues. For example, an administrator may change application settings to address security vulnerabilities identified by the updated code scanner. Upon modifying the application code, the system may send a notification to any users or entities who downloaded previous versions of the application code that an updated version is available. Since the system performed the scan of the application code, the entities or users who stored previous versions of the application code do not need to perform a scan of the code. Instead, the entities or users may download the new version of the application code stored in the scanned application code repository that has been scanned with the updated code scanner(s).

Additionally, or alternatively, the system may store multiple versions of application code that have been scanned by different code scanners or different versions of the same code scanner. For example, a system may determine that (a) an update to a code scanner identifies a particular security vulnerability, (b) addressing the security vulnerability would require a change to the application code, (c) the change to the application code is incompatible with a particular client's system, and (d) the previous (e.g., non-updated) version of the application code scanned by the previous (non-updated) code scanner meets the system's minimum security requirements. In this case, the system may store one version of a set of application code that passes an application code scan performed by a previous version of a code scanner. The system may further store another version of the set of application code that passes an application code scan performed by an updated version of the code scanner.

In one or more embodiments, the system maintains a repository of code scanners. The system may store code scanners that have been validated by the system as (a) meeting predefined criteria, and (b) being compatible with a set of applications maintained by an entity accessing the system. The system may maintain a variety of different code scanners as well as different versions of the same code scanner. The system may present to authorized users a set of code scanners that have been validated and authenticated for use by an organization. For examiner, a software development team may request a set of code scanners to scan a software artifact that is under development. The system may present the software development team with a set of code scanners that have been validated for use within the organization to scan the software artifact. Additionally, or alternatively, an entity within an organization may request a third-party code scanner to scan an application being used by the entity. The system may validate the third-party code scanner. Based on validating the third-party code scanner, the system may store the code-scanner in the repository of code scanners. The system may further authorize the third-party code scanner for use within the organization.

In one or more embodiments, the system generates a recommendation for one or more code scanners based on analyzing a set of application code and identifying parameters of the application code. For example, a user may request a particular code scanner to execute a quality control scan on a set of software code. The system may analyze the software code to identify parameters, such as a set of operations that are performed by the software code, input types of data provided to the software code, and output types of data generated by the software code. Based on the software code parameters, the system may generate a recommendation to the user that a different code scanner, that is different from the requested code scanner, is a better match to perform the requested scan. For example, the requested scan may not scan for a set of conditions that have historically corresponded to successful execution of software code. However, the recommended code scanner may include a scan for the set of conditions.

In one or more embodiments, the system identifies a set of code scanners that are required to be executed on a set of application code. For example, a user may request to run a third-party application in a cloud environment. The administrator of the cloud environment may require a set of security-type scans to ensure that any applications run in the cloud environment meet a set of security requirements. The system may notify the requesting user of the required code scans. As one example, the system may initiate the code scans. The system may notify the requesting user whether the application code passed the set of required code scans.

4. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3:
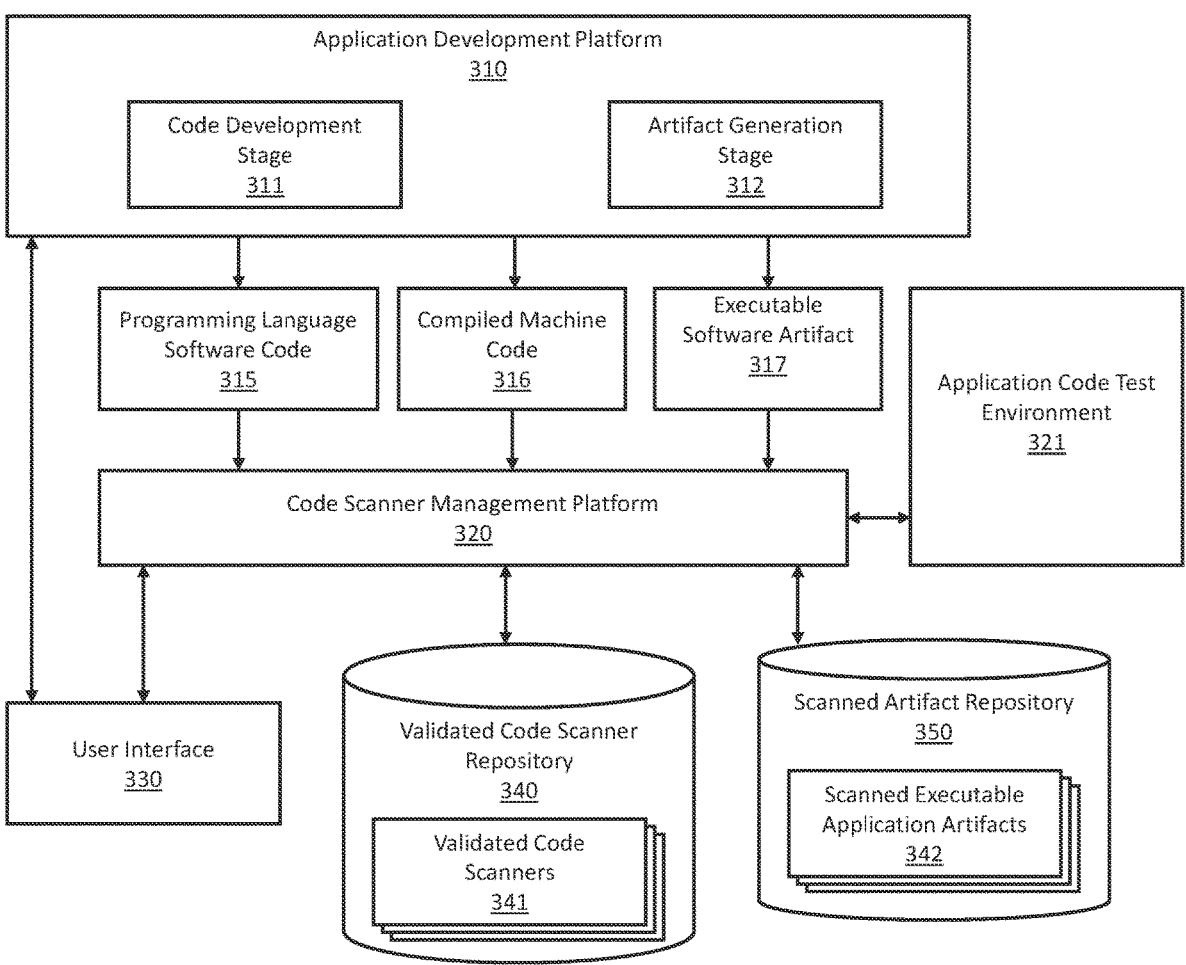
FIG. 3 illustrates an example embodiment.

FIG. 3 illustrates a system according to an example embodiment. The system includes an application development platform 310. One or more application developers access the application development platform 310 via the user interface 330 to develop, test, and implement application code. The application development platform 310 includes a code development stage 311 and an artifact generation stage 312. The code development stage 311 represents user interfaces, applications, and processing hardware necessary to generate, modify, and evaluate application code. According to one example, the code development stage 311 is implemented as a code-programming application running on a server in a cloud environment. The code-programming application allows a user who accesses the application development platform 310 via the user interface 330 to generate an application using programming language software code, such as JAVA, PYTHON, and C. In the course of development, a user generates a set of programming language software code 315 (referred to herein as "source code 315") in a particular programming language. Prior to completing a set of application code, the user may compile the source code to generate compiled machine code 316. For example, the user may perform intermediate compile operations to test and scan portions of an application prior to creating the full application. The executable software artifact 317 represents a set of compiled machine code that, when executed, runs an application. In other words, the executable software artifact 317 may correspond to compiled machine code for a completed application. A user may choose to perform one or more scans on a set of application code over the course of development, such as prior to completion of the application code (e.g., prior to completing a set of code that corresponds to an executable application) or subsequent to completion of the application code.

In the example embodiment of FIG. 3, the system presents to a user via the user interface 330 a graphical user interface (GUI) that includes one or more of the following: elements representing source code 315, elements representing compiled machine code 316 that is not an executable artifact, elements representing executable software artifacts 317, validated code scanners 341, and scanned executable application artifacts 342. By interacting with the GUI, a user may select application code and/or scans to run on the application code.

Upon completing the source code required to implement the software application, the user may select one or more scans to run on an executable software artifact 317. The executable software artifact 317 corresponds to compiled machine code 316 that may be downloaded and executed on computing devices.

In one example, a user selects an interface element in a GUI to "Identify Scans for Code." The user further selects a set of application code (e.g., source code 315, compiled machine code 316, or executable software artifact 317) on which to apply the scan. The selected interface element "Identify Scans for Code" instructs the system to analyze a set of selected source code to determine which validated code scanners 341 stored in a validated code scanner repository 340 are compatible with the selected application code. As an example, the system may identify code scanners that check for syntax errors in source code 315. As another example, the system may identify code scanners that are programmed by an entity to ensure that source code 315 complies with formatting rules, such as rules for assigning names to variables, rules for how a program accesses data, rules for which operations may be performed to achieve particular results, and rules for annotating source code with informative metadata that is not subsequently compiled by a compiler. Based on the user selection of the interface element requesting the system to identify code scanners to be applied to application code, the system may analyze parameters of a set of selected application code to determine which validated code scanners 341 may be applied to the selected application code. For example, upon identifying the type of code as source code 315 and not compiled machine code 316, the system may filter a set of code scanners to present to a user a set of code scanners that can be applied to source code 315. The system may filter out from among the set of presented code scanners any code scanners that are applied to compiled machine code 316. As another example, upon determining the source code 315 is written in a C programming language, the system may filter the set of code scanners to include scanners associated with C the C programming language and to omit code scanners associated with other programming languages. As another example, based on determining a set of source code 315 pertains to a particular entity, such as a particular application development group within a company, the system may filter the set of presented code scanners to include the scanners authorized for use within the particular application development group. The system may omit from the filtered set of presented code scanners those scanners that are not authorized for use within the particular application development group.

As another example, the system may identify a set of application code selected by a user in a GUI as compiled machine code 316. The system may present to the user a filtered set of code scanners 341 that includes code scanners that can be applied to compiled machine code and excludes code scanners that cannot be applied to compiled machine code, such as code scanners that are applied to source code 315.

In the example, embodiment of FIG. 3, instead of requesting that the system identify a set of code scanners that may be applied to a set of application code, a user may select in the GUI an element representing a particular validated code scanner, from among the validated code scanners 341, and a particular set of application code that the user wants the selected code scanner to be applied to. Based on the user selections, the system analyzes parameters of the application code and determines that the scanner cannot be applied to the application code. For example, the system may determine that the code scanner is applicable to compiled machine code but the user selected source code. The system may prompt the user to request instructions whether to modify the selected source code to be able to be scanned by the selected code scanner. For example, if the user selects a scanner that is applied to compiled code and the user also selects a set of source code, the system may compile the source code to generate a corresponding set of compiled machine code 316. The system may then apply the code scanner 341 selected by the user to the compiled machine code 316. Similarly, if the system determines the selected code scanner is for source code but the user selected a set of compiled machine code, the system may identify the set of source code from which the compiled machine code was generated. The system may prompt the user to determine whether to apply the selected code scanner to the identified set of source code.

In one example embodiment, the GUI may present elements representing various types of scans, such as syntax scans, quality-assurance scans, and security scans. Based on a user selection, the system analyzes parameters of a set of source code to determine which validated code scanner 341 to apply to the application code. For example, if a user is generating a set of source code 315 in a GUI, the system may present in a side bar of the GUI elements representing the different types of scans that the user may apply to the application code. Based on the user selection of one or more of the types of scans, the system identifies one or more code scanners, from among the validated code scanners 341, to apply to the source code 315 that the user is generating.

In the example embodiment of FIG. 3, the validated code scanners 341 include a scanner that analyzes data output from applications at run-time. The system includes an application code test environment 321 to model run-time conditions, including run-time inputs. When the user selects a scanner that analyzes run-time data to apply to an executable software artifact 317, the system executes the software artifact 317 in the application code test environment 321. In the example illustrated in FIG. 3, the application code test environment is a virtual machine running on a server in a cloud environment. The system generates input data that simulates run-time input data. The selected code scanner 341 analyzes the operation of the software artifact 317 as it runs in the application code test environment 321.

In the example embodiment of FIG. 3, the code scanner management platform 320 determines a data extraction process for extracting data to apply a selected code scanner to a selected set of application code. The platform 320 determines the extraction process by comparing the code scanner parameters with the application parameters. The system determines processes to be performed to cause the application parameters to correspond to the code scanner parameters. For example, if the platform 320 determines that the user selected a set of application code that outputs data in one format and a scanner that receives data in another format, the platform 320 determines a conversion process to convert the output of the application code into a format that is ingestible by the scanner. Similarly, if the platform 320 determines that a scanner is configured to search for input data from a particular memory location, the platform 320 may store a copy of a selected set of application code at the memory location.

When the code scanner management platform 320 determines that an executable software artifact 317 passes a set of code scanners, the platform 320 stores the artifact in the scanned artifact repository 350 as a scanned executable application artifact 342. When users want to download the corresponding application, the platform 320 provides the user with a copy of the scanned executable application artifact 342 stored in the repository 350.

The code scanner management platform 320 detects when an update to a validated code scanner 341 is received from a third party. For example, a security software provider may regularly update a security scanner to account for newly-identified threats. Based on detecting an update to an existing validated code scanner 341, the code scanner management platform 320 (a) validates the updated code scanner, and (b) re-scans the artifact 342 that was previously scanned by the previous version of the validated code scanner 341. If the application passes a scanning operation performed by the updated code scanner, the system stores the scanned artifact 342 in the repository 350. If the application does not pass the scanning operation performed by the updated code scanner, the system determines whether to de-authorize an artifact 342 until the corresponding source code 315 may be modified to cause the artifact to pass the scan. The determination whether to de-authorize a previously scanned artifact 342 may be based on a set of policies or rules implemented by an organization. For example, the organization may implement a policy to de-authorize any artifact that does not pass a scan performed by the most recently-updated code scanner. Alternatively, the organization may implement a policy to de-authorize any artifact that does not meet a set of criteria, such as passing particular elements of a code scanner. For example, an application may meet a set of encryption requirements and data access requirements. The application may fail to meet a set data configuration requirements. The organization may implement a policy to allow the artifact to remain authorized based on meeting the encryption and data access requirements. Authorized artifacts may be stored in the repository 350 as scanned executable application artifacts 342. De-authorized artifacts may be removed from the repository 350.

In the example illustrated in FIG. 3, a user may modify a scanned executable application artifact 342. For example, if the artifact 342 fails to pass a scan from an updated code scanner, a user may modify the source code 315 associated with the artifact 342. The user may cause the application development platform 310 to re-compile the modified source code 315 to generate an updated software artifact 317. The code scanner management platform 320 may re-run the updated code scanner on the executable software artifact 317. Based on determining the artifact 317 passes the scan by the updated code scanner, the platform 320 stores the updated artifact 317 in the scanned artifact repository 350 as a scanned executable application artifact 342. The code scanner management platform 320 may further identify any user devices that have the previous version of the application code installed. The platform 320 may schedule an update to modify the installed versions of the application code to the modified version of the application code that passed the scan by the updated code scanner.

According to the above example embodiment, a system stores a set of selectable code scanners to scan application code at different stages of development. A user may select one code scanner to scan a set of source code 315. The user may select another code scanner to scan a corresponding set of compiled machine code 316. The user may select yet another code scanner to scan an executable software artifact 317. The system stores a set of scanned artifacts 342 in a repository 350. When users want to run an artifact, the user selects one of the scanned executable application artifacts 342. Accordingly, the user does not need to run code scans on the user device. In addition, the user does not need to receive code scanner updates at the user device.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
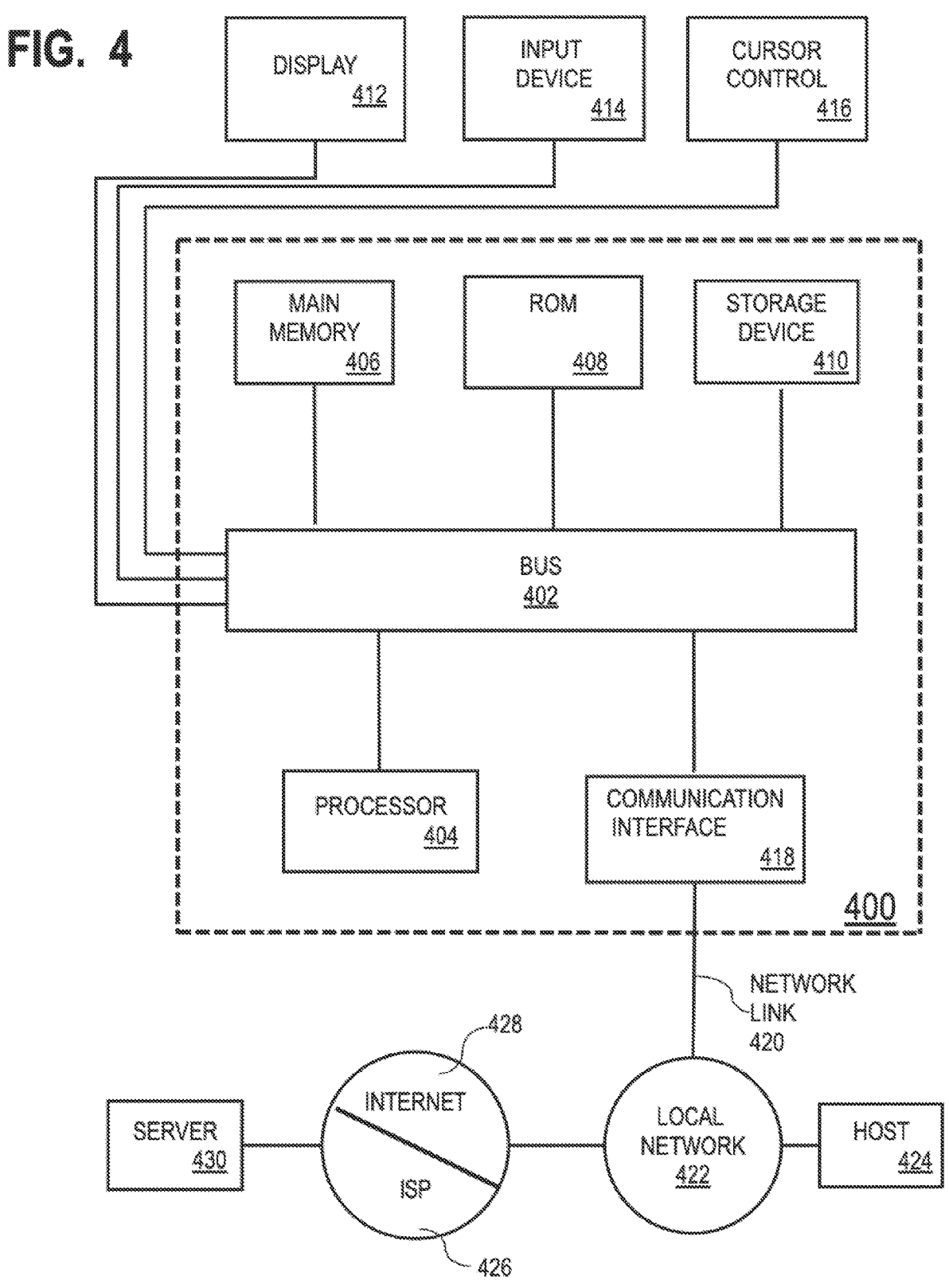
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid-State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, that carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory machine-readable media storing instructions which, when executed by one or more processors, perform operations comprising:

obtaining a plurality of code scanning applications;

identifying a plurality of input data parameters corresponding to the plurality of code scanning applications, including a first plurality of input parameters corresponding to a first code scanning application, wherein the plurality of input data parameters specify data requirements for sets of input data to be input to the plurality of code scanning applications;

receiving a scanning request associated with a first target application;

responsive to the scanning request, obtaining a first set of metadata defining attributes of the first target application;

using the first set of metadata, determining a first set of data associated with the first target application that corresponds to the first plurality of input parameters;

determining an extraction process for extracting the first set of data from the first target application to apply the first code scanning application to the first target application; and using the first set of data as the first plurality of input parameters, applying the first code scanning application to the first target application to generate a first set of scanning results corresponding to the first target application.

2. The one or more non-transitory machine-readable media of claim 1, wherein determining the extraction process comprises:

determining the first code scanning application is configured to scan machine code; and determining attributes of the machine code to be extracted to apply the first code scanning application to the first target application.

3. The one or more non-transitory machine-readable media of claim 1, wherein determining the extraction process comprises:

determining the first code scanning application is configured to scan executable application code; and determining attributes of the executable application code to be extracted to apply the first code scanning application to the first target application.

4. The one or more non-transitory machine-readable media of claim 3, wherein applying the first code scanning application to the first target application comprises:

executing the first target application to generate at least a portion of the first set of data.

5. The one or more non-transitory machine-readable media of claim 1, wherein the first set of data comprises at least one of a second set of data corresponding to data provided to the first target application to execute at least one application programming interface call (at least one API call) of the first target application, and a third set of data corresponding to data output from the first target application in response to executing the at least one API call, and wherein determining the extraction process comprises:

querying an API associated with the first target application to identify at least one of: (a) first attributes of the second set of data, and (b) second attributes of the third set of data.

6. The one or more non-transitory machine-readable media of claim 1, wherein determining the extraction process comprises:

determining at least one of a location and a type of the first set of data.

7. The one or more non-transitory machine-readable media of claim 6, wherein determining the at least one of the location and the type of the first set of data comprises exposing an application programming interface (API) for the first target application to determine the at least one of the location and the type of the first set of data.

8. The one or more non-transitory machine-readable media of claim 1, wherein the operations further comprise:

identifying a second plurality of input parameters corresponding to a second code scanning application;

responsive to the scanning request, obtaining a second set of metadata defining the attributes of the first target application;

using the second set of metadata to determine an extraction process for extracting a second set of data, associated with the first target application, that is needed for applying the second code scanning application to the first target application; and using the second set of data as the second plurality of input parameters, applying the second code scanning application to the first target application to generate a second set of scanning results corresponding to the first target application.

9. A method comprising:

obtaining a plurality of code scanning applications;

identifying a plurality of input data parameters corresponding to the plurality of code scanning applications, including a first plurality of input parameters corresponding to a first code scanning application, wherein the plurality of input data parameters specify data requirements for sets of input data to be input to the plurality of code scanning applications;

receiving a scanning request associated with a first target application;

responsive to the scanning request, obtaining a first set of metadata defining attributes of the first target application;

using the first set of metadata, determining a first set of data associated with the first target application that corresponds to the first plurality of input parameters;

determining an extraction process for extracting the first set of data from the first target application to apply the first code scanning application to the first target application; and using the first set of data as the first plurality of input parameters, applying the first code scanning application to the first target application to generate a first set of scanning results corresponding to the first target application.

10. The method of claim 9, wherein determining the extraction process comprises:

determining the first code scanning application is configured to scan machine code; and determining attributes of the machine code to be extracted to apply the first code scanning application to the first target application.

11. The method of claim 9, wherein determining the extraction process comprises:

determining the first code scanning application is configured to scan executable application code; and determining attributes of the executable application code to be extracted to apply the first code scanning application to the first target application.

12. The method of claim 11, wherein applying the first code scanning application to the first target application comprises:

executing the first target application to generate at least a portion of the first set of data.

13. The method of claim 9, wherein the first set of data comprises at least one of a second set of data corresponding to data provided to the first target application to execute at least one application programming interface call (at least one API call) of the first target application, and a third set of data corresponding to data output from the first target application in response to executing the at least one API call, and wherein determining the extraction process comprises:

querying an API associated with the first target application to identify at least one of: (a) first attributes of the second set of data, and (b) second attributes of the third set of data.

14. The method of claim 9, wherein determining the extraction process comprises: determining at least one of a location and a type of the first set of data.

15. The method of claim 14, wherein determining the at least one of the location and the type of the first set of data comprises exposing an application programming interface (API) for the first target application to determine the at least one of the location and the type of the first set of data.

16. The method of claim 9, further comprising:

identifying a second plurality of input parameters corresponding to a second code scanning application;

responsive to the scanning request, obtaining a second set of metadata defining the attributes of the first target application;

using the second set of metadata to determine an extraction process for extracting a second set of data, associated with the first target application, that is needed for applying the second code scanning application to the first target application; and using the second set of data as the second plurality of input parameters, applying the second code scanning application to the first target application to generate a second set of scanning results corresponding to the first target application.

17. A system comprising:

one or more processors; and memory storing instructions that, when executed by the one or more processors, cause the system to perform operations comprising:

obtaining a plurality of code scanning applications;

identifying a plurality of input data parameters corresponding to the plurality of code scanning applications, including a first plurality of input parameters corresponding to a first code scanning application, wherein the plurality of input data parameters specify data requirements for sets of input data to be input to the plurality of code scanning applications;

receiving a scanning request associated with a first target application;

responsive to the scanning request, obtaining a first set of metadata defining attributes of the first target application;

using the first set of metadata, determining a first set of data associated with the first target application that corresponds to the first plurality of input parameters;

determining an extraction process for extracting the first set of data from the first target application to apply the first code scanning application to the first target application; and using the first set of data as the first plurality of input parameters, applying the first code scanning application to the first target application to generate a first set of scanning results corresponding to the first target application.

18. The system of claim 17, wherein determining the extraction process comprises:

determining the first code scanning application is configured to scan machine code; and determining attributes of the machine code to be extracted to apply the first code scanning application to the first target application.

19. The system of claim 17, wherein determining the extraction process comprises:

determining the first code scanning application is configured to scan executable application code; and determining attributes of the executable application code to be extracted to apply the first code scanning application to the first target application.

20. The system of claim 19, wherein applying the first code scanning application to the first target application comprises:

executing the first target application to generate at least a portion of the first set of data.

* * * * *